(12) United States Patent
Modin et al.

(10) Patent No.: US 9,770,872 B2
(45) Date of Patent: *Sep. 26, 2017

(54) METHOD OF FABRICATING FIBER REINFORCED COMPOSITE STRUCTURE HAVING STEPPED SURFACE

(71) Applicant: The Boeing Company, Chicago, IL (US)

(72) Inventors: Andrew E. Modin, Enumclaw, WA (US); Jack A. Woods, Kent, WA (US); Robert D. Hawkins, Bonney Lake, WA (US)

(73) Assignee: THE BOEING COMPANY, Chicago, IL (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/698,841

(22) Filed: Apr. 28, 2015

(65) Prior Publication Data

US 2015/0231834 A1    Aug. 20, 2015

Related U.S. Application Data

(62) Division of application No. 13/869,195, filed on Apr. 24, 2013, now Pat. No. 9,056,448, which is a division
(Continued)

(51) Int. Cl.
  *B29C 70/34* (2006.01)
  *B29C 70/54* (2006.01)
  *B29L 31/30* (2006.01)

(52) U.S. Cl.
  CPC ............ *B29C 70/34* (2013.01); *B29C 70/545* (2013.01); *B29L 2031/3076* (2013.01); *Y10T 156/1057* (2015.01); *Y10T 428/24628* (2015.01)

(58) Field of Classification Search
  CPC .................................................. B29C 70/545
  See application file for complete search history.

(56) References Cited

U.S. PATENT DOCUMENTS

| | | |
|---|---|---|
| 2,478,165 A | 8/1949 | Collins |
| 2,495,640 A | 1/1950 | Muskat |

(Continued)

FOREIGN PATENT DOCUMENTS

| | | |
|---|---|---|
| DE | 19813104 A1 | 9/1999 |
| DE | 19915083 C1 | 4/2000 |

(Continued)

OTHER PUBLICATIONS

USPTO Final Office Action, dated Jan. 25, 2010, regarding U.S. Appl. No. 11/464,517, 15 pages.

(Continued)

*Primary Examiner* — William Bell
(74) *Attorney, Agent, or Firm* — Yee & Associates, P.C.

(57) ABSTRACT

Fiber reinforced composite structures having curved stepped surfaces are fabricated by laying up plies of fiber reinforced material over a tool having a stepped tool feature. The plies are rotated about a fixed axis as they are laid up to substantially form a fixed axis rosette pattern. The plies are angularly oriented such that at least certain of the plies have fiber orientations other than 0, +45, −45 and 90 degrees. Potential bridging of the fibers over the stepped tool features is reduced or eliminated by cutting slits in the plies in the area of the stepped features, so that the plies can be fully compacted.

10 Claims, 7 Drawing Sheets

Related U.S. Application Data of application No. 11/753,849, filed on May 25, 2007, now Pat. No. 8,449,709.

(56) References Cited

U.S. PATENT DOCUMENTS

| | | | |
|---|---|---|---|
| 3,356,781 A | 12/1967 | Sulewski et al. | |
| 4,622,091 A | 11/1986 | Letterman | |
| 4,741,943 A | 5/1988 | Hunt | |
| 4,902,215 A | 2/1990 | Seemann, III | |
| 4,942,013 A | 7/1990 | Palmer et al. | |
| 5,236,321 A | 8/1993 | Newton | |
| 5,281,388 A | 1/1994 | Palmer et al. | |
| 5,322,665 A | 6/1994 | Bernardon et al. | |
| 5,441,692 A | 8/1995 | Taricco | |
| 5,443,912 A | 8/1995 | Olson | |
| 5,518,385 A | 5/1996 | Graff | |
| 5,576,030 A | 11/1996 | Hooper | |
| 5,988,566 A | 11/1999 | Meyer | |
| 6,007,917 A | 12/1999 | Weigel et al. | |
| 6,454,893 B1 | 9/2002 | McKague, Jr. | |
| 6,482,497 B1 | 11/2002 | Kay et al. | |
| 6,527,894 B1 | 3/2003 | Rocker et al. | |
| 6,843,953 B2 | 1/2005 | Filsinger et al. | |
| 6,915,988 B2 | 7/2005 | Sanz et al. | |
| 7,008,555 B2 | 3/2006 | Hayes et al. | |
| 7,014,806 B2 | 3/2006 | Edelmann et al. | |
| 7,028,950 B2 | 4/2006 | Salmon et al. | |
| 7,060,156 B2 | 6/2006 | Mack et al. | |
| 7,080,807 B2 | 7/2006 | Olson et al. | |
| 7,118,070 B2 | 10/2006 | Abrams et al. | |
| 7,138,167 B2 | 11/2006 | Sakonjo et al. | |
| 7,175,795 B2 | 2/2007 | Eberth et al. | |
| 7,208,220 B2 | 4/2007 | Yamasaki et al. | |
| 7,255,549 B2 | 8/2007 | Hadley | |
| 7,281,686 B2 | 10/2007 | Wood | |
| 7,334,782 B2 | 2/2008 | Woods et al. | |
| 7,413,694 B2 | 8/2008 | Waldrop, III et al. | |
| 7,633,040 B2 | 12/2009 | Glain et al. | |
| 7,802,413 B2 | 9/2010 | Wood et al. | |
| 7,968,170 B2 | 6/2011 | Albers et al. | |
| 7,988,093 B2 | 8/2011 | Bold | |
| 8,066,503 B2 | 11/2011 | Hawkins | |
| 8,123,168 B2 | 2/2012 | Switzer et al. | |
| 8,449,709 B2 | 5/2013 | Modin et al. | |
| 9,056,448 B2 | 6/2015 | Modin et al. | |
| 2002/0022422 A1 | 2/2002 | Waldrop, III et al. | |
| 2003/0102604 A1 | 6/2003 | Mack et al. | |
| 2003/0222371 A1 | 12/2003 | Edelmann et al. | |
| 2004/0140587 A1 | 7/2004 | Hadley | |
| 2004/0219251 A1 | 11/2004 | Eberth et al. | |
| 2004/0219855 A1 | 11/2004 | Tsotsis | |
| 2004/0242836 A1 | 12/2004 | Hayes et al. | |
| 2004/0262453 A1 | 12/2004 | Sanz et al. | |
| 2005/0053787 A1 | 3/2005 | Yamasaki et al. | |
| 2005/0073076 A1 | 4/2005 | Woods et al. | |
| 2005/0103942 A1 | 5/2005 | Abrams et al. | |
| 2005/0170731 A1* | 8/2005 | Droux | B29C 70/16 442/381 |
| 2005/0247822 A1 | 11/2005 | McKee et al. | |
| 2006/0071125 A1 | 4/2006 | Sewell et al. | |
| 2006/0249877 A1 | 11/2006 | Kaneko et al. | |
| 2007/0029038 A1 | 2/2007 | Brown et al. | |
| 2007/0034743 A1 | 2/2007 | Albers et al. | |
| 2007/0090562 A1 | 4/2007 | Hawkins | |
| 2007/0100565 A1 | 5/2007 | Gosse et al. | |
| 2007/0108665 A1 | 5/2007 | Aquino et al. | |
| 2007/0181746 A1 | 8/2007 | Wood | |
| 2008/0048359 A1 | 2/2008 | Krogager et al. | |
| 2008/0078876 A1 | 4/2008 | Baggette et al. | |
| 2008/0078877 A1 | 4/2008 | Baggette et al. | |
| 2008/0078878 A1 | 4/2008 | Bold | |
| 2008/0169380 A1 | 7/2008 | Jackson et al. | |
| 2008/0289747 A1 | 11/2008 | Hawkins et al. | |
| 2010/0040722 A1 | 2/2010 | Aquino et al. | |
| 2010/0233423 A1* | 9/2010 | Corden | B29C 70/14 428/113 |
| 2013/0236685 A1 | 9/2013 | Modin et al. | |

FOREIGN PATENT DOCUMENTS

| | | | |
|---|---|---|---|
| DE | 19944164 A1 * | 6/2000 | B29C 70/46 |
| DE | 102004025378 A1 | 12/2005 | |
| EP | 0249889 A2 | 12/1987 | |
| EP | 0525263 A1 | 2/1993 | |
| EP | 1602470 A1 | 12/2005 | |
| EP | 1642826 A1 | 4/2006 | |
| FR | 2633213 A1 * | 12/1989 | B29B 15/08 |
| JP | S60224530 A | 11/1985 | |
| WO | WO8301237 A1 | 4/1983 | |
| WO | WO03101708 A1 | 12/2003 | |
| WO | WO2004080697 A1 | 9/2004 | |
| WO | WO2005115728 A1 | 12/2005 | |
| WO | WO2007059148 A2 | 5/2007 | |
| WO | WO2008063247 A2 | 5/2008 | |

OTHER PUBLICATIONS

USPTO Final Office Action, dated Feb. 18, 2011, regarding U.S. Appl. No. 11/464,517, 13 pages.
USPTO Final Office Action, dated Dec. 22, 2011, regarding U.S. Appl. No. 11/464,517, 17 pages.
USPTO Office Action, dated Apr. 18, 2012, regarding U.S. Appl. No. 11/464,517, 17 pages.
USPTO Office Action, dated Jun. 10, 2009, regarding U.S. Appl. No. 11/464,517, 16 pages.
USPTO Office Action, dated Jul. 8, 2011, regarding U.S. Appl. No. 11/464,517, 14 pages.
USPTO Office Action, dated Jul. 23, 2010, regarding U.S. Appl. No. 11/464,517, 14 pages.
USPTO Notice of Allowance, dated May 22, 2007, regarding U.S. Appl. No. 10/485,725, 6 pages.
USPTO Office Action, dated Dec. 12, 2006, regarding U.S. Appl. No. 10/485,725, 8 pages.
USPTO Office Action, dated Dec. 15, 2011, regarding U.S. Appl. No. 12/611,844, 8 pages.
Final office action dated Jun. 4, 2012, regarding U.S. Appl. No. 11/753,849, 25 pages.
Final office action dated Jun. 16, 2011, regarding U.S. Appl. No. 11/753,849, 17 pages.
Final office action dated Jul. 7, 2010, regarding U.S. Appl. No. 11/753,849, 14 pages.
Non-final office action dated Jan. 13, 2011, regarding U.S. Appl. No. 11/753,849, 14 pages.
Non-final office action dated Feb. 4, 2010, regarding U.S. Appl. No. 11/753,849, 16 pages.
Non-final office action dated Nov. 30, 2011, regarding U.S. Appl. No. 11/753,849, 21 pages.
Notice of allowance dated Jan. 28, 2013, regarding U.S. Appl. No. 11/753,849, 22 pages.
USPTO Office Action, dated Nov. 26, 2008, regarding U.S. Appl. No. 11/271,965, 8 pages.
USPTO Notice of Allowance, dated Aug. 5, 2009, regarding U.S. Appl. No. 11/271,965, 6 pages.
Craen et al., "The Compression Response of Fibre Beds Subjected to Repeated Loading Cycles in the Resin Infusion Under Flexible Tooling (RIFT) Manufacturing Process," International Conference on Fibre Reinforced Composites No. 7, Apr. 1998, pp. 120-127.
Peters, S.T., Handbook of Composites, Second Edition, 1998, pp. 577,595.
Williams et al., "The Compression Response of Fibre-Reinforced Plastic Plates During Manufacture by the Resin Infusion Under Flexible Tooling Method," Composites Part A, Jan. 1998, vol. 29A, No. 1, pp. 111-114.
Baker, A., Dutton S. and D. Kelly, Composite Materials for aircraft Structures, Second Edition, 2004, pp. 1-21.

(56) References Cited

OTHER PUBLICATIONS

International Search Report, dated Sep. 1, 2003, regarding Application No. PCT/US03/16794 (WO03101708), 3 pages.
International Search Report, dated May 4, 2007, regarding Application No. PCT/US2006/044223 (WO2007059148), 3 pages.
International Search Report, dated Jul. 22, 2008, regarding Application No. PCT/US2007/015163 (WO2008063247), 3 pages.
Office Action, dated Nov. 21, 2014, regarding U.S. Appl. No. 13/869,195, 24 pages.
Notice of Allowance, dated Feb. 3, 2015, regarding U.S. Appl. No. 13/869,195, 7 pages.
Extended European Search Report, dated Jan. 7, 2016, regarding Application No. EP08156854.5, 7 pages.

* cited by examiner

METHOD OF FABRICATING FIBER REINFORCED COMPOSITE STRUCTURE HAVING STEPPED SURFACE

TECHNICAL FIELD

This disclosure generally relates to processes for fabricating fiber resin composite structures, and deals more particularly with a method for forming fiber reinforced laminates having stepped surfaces, especially those with curvature.

This application is a divisional application of U.S. patent application Ser. No. 13/869,195, filed Apr. 24, 2013, which is a divisional application of U.S. patent application Ser. No. 11/753,849, filed May 25, 2007.

BACKGROUND

Fiber reinforced synthetic resin structures, such as carbon fiber reinforced laminates may be formed by laying multiple plies of tape or fabric over a tool, and then compacting the layup using any of several known techniques. In the case of tape, the fibers are unidirectional, while the fabrics typically include two sets of fibers that may be either woven or knitted, extending at pre-selected angles relative to a reference direction.

The sequence and orientation of the plies may determine, at least in part, the mechanical properties of the final structure, including rigidity and stiffness. These mechanical properties also may be affected by the tooling used to produce structural features, such as stepped and/or curved surfaces. Where the reinforcing fibers possess a relatively high modulus and are therefore relatively stiff, the fibers may not conform to tooling features, such as stepped surfaces. As a result, some of the fibers may bridge-over certain features of the tooling, resulting in plies in the area of the bridging that may be less than fully compacted, thus reducing the performance of the finished laminate.

Accordingly, there is a need for a method of fabricating fiber reinforced structures having stepped or uneven surfaces that solves the problems discussed above. Illustrated embodiments of the disclosure are intended to provide this solution.

SUMMARY

Illustrated embodiments of the disclosure provide a method of fabricating fiber reinforced composite structures using a ply layup sequence in which successive plies are rotated or indexed about a central axis to form a fixed rosette. By using additional ply orientations in addition to the commonly used quasi-isotropic design of 0, 90, +/−45 angles, and forming slits in the plies at locations where fiber bridging may occur over layup tooling, the fabricated structure may be more homogeneous, and exhibit improved off-axis properties.

According to one embodiment, a method is provided for fabricating a fiber reinforced composite structure having a stepped surface. The method comprises the steps of: laying up a plurality of fiber reinforced material plies in a fixed axis rosette pattern over a tool having a stepped tool surface; forming a slit in each of the plies in areas of the stepped surface where bridging will occur; and, consolidating the plies. The slits are formed in a direction generally perpendicular to the direction of the bridging fibers. During layup, the plies are successively rotated or angularly indexed such that at least certain of the plies may have fiber orientations other than 0, +45, −45 and 90 degrees.

According to a further embodiment, a method is provided for fabricating a structure reinforced with stiff fibers and having a stepped feature. The method comprises the steps of: providing a plurality of plies of material reinforced with stiff fibers; arranging at least certain of the plies over a tool such that at least certain of the fibers bridge over the stepped feature; cutting the certain fibers in the area of the stepped feature; and, compacting the plies. The fibers are arranged by orienting the plies relative to each other such that the openings are angularly spaced from each other.

According to still another embodiment, a method is provided of fabricating a window frame for an aircraft, wherein the window frame includes a curved joggle surrounding a central window opening. The method comprises the steps of: providing a tool having curved stepped tool surfaces for forming the joggle in the frame; providing a plurality of plies of material reinforced with stiff fibers each having an axis of orientation; laying up the plies over the tool such that the axes of the fiber orientation for the plies radiate substantially from a fixed point; forming a slit in areas of each of the plies where the fibers in the plies cross the curved joggle; and consolidating the plies.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
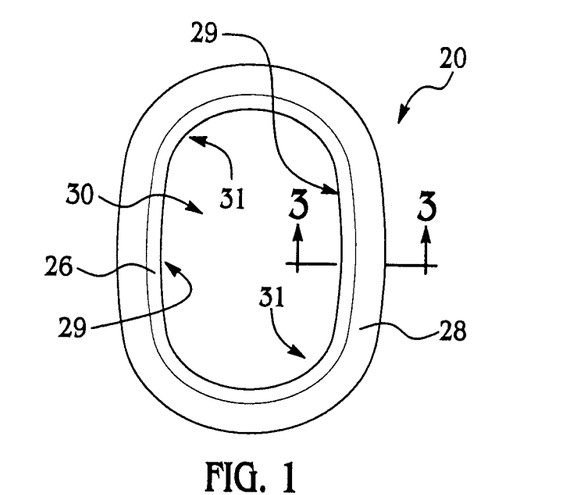
FIG. 1 is an elevational illustration of a composite window frame for aircraft manufactured by a method according to an embodiment of the disclosure.
Figure 2:
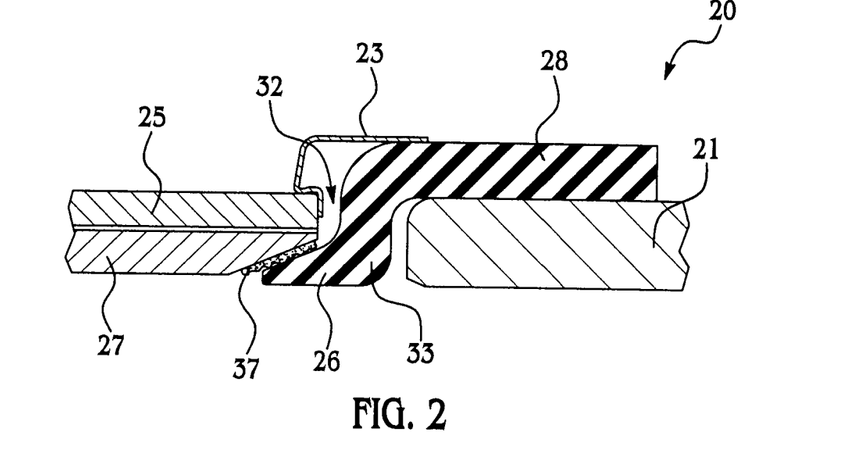
FIG. 2 is a fragmentary, cross section illustration of a portion of the window frame of FIG. 1 mounted on an aircraft fuselage and holding a window pane assembly.
Figure 3:
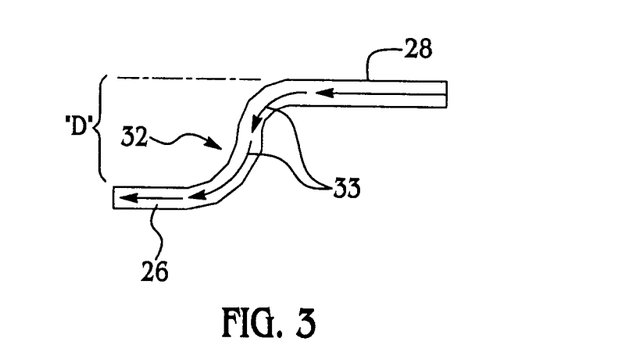
FIG. 3 is a sectional illustration taken along the line 3-3 in FIG. 1.

Referring first to FIGS. 1-3, a composite structure in the form of a window frame 20 includes inner and outer flanges 26, 28 respectively surrounding a central window opening 30. The window frame 20, which may be installed in the fuselage of an aircraft for example, is generally oval in shape and includes straight or nearly straight sides 29 connected by curved corner sections 31.

As shown in FIG. 2, the outer flange 28 may overlie the inboard side of a fuselage skin 21 formed over an aircraft frame (not shown). The inner and outer flanges 26, 28 may be joined by an S-shaped cross section 33 forming a joggle 32 that extends around the entire frame 20. A mechanical clip 23 holds a pair of window panes 25, 27 respectively, on the inner flange 26 of the window frame 20, within the opening 30. A seal 37 may be used to seal the window pane 27 on the inner flange 26.

As best seen in FIG. 3, the joggle 32 forms a step or separation between the flanges 26, 28 equal to a distance "D". As will be discussed below in more detail, the window frame 20 is formed of laminated plies 38 of a fiber reinforced synthetic resin, such as carbon fiber reinforced epoxy. Each of the plies may include fibers 34a, 34b (FIG. 4) that extend across the width of the frame 20, and therefore take the shape of the S-shaped curved section 33 which creates the joggle 32. Thus, the reinforcing fibers 34a, 34b must be compacted into a curve conforming to the S-shaped section 33. Further, some of the fibers 34a, 34b must also be compacted to form the curved sections 31 (FIG. 1). As a result, some of the fibers 34a, 34b are shaped into a compound curve formed by the combination of the joggle 32 and the curved sections 31.

Figure 4:
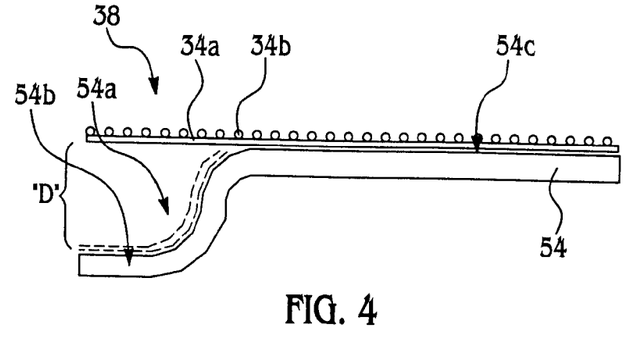
FIG. 4 is an illustration similar to FIG. 3, but showing a single ply of fiber reinforced resin laid over the tool in preparation for compaction.
Figure 5:
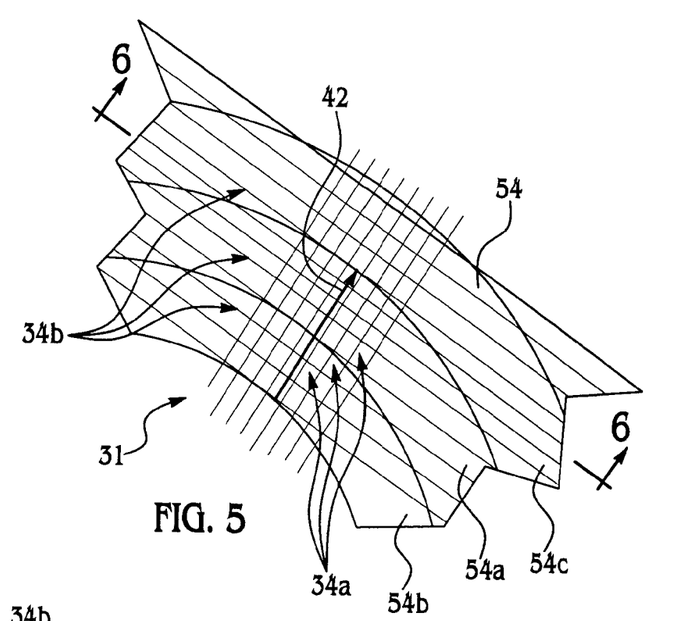
FIG. 5 is a plan illustration of a portion of the window frame, showing the orientation of a slit formed in bridging fibers of the ply shown in FIG. 4.
Figure 5A:
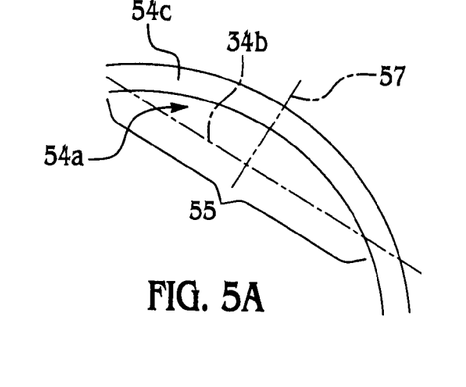
FIG. 5A is a plan illustration of the area of bridging for a single fiber forming part of the frame portion shown in FIG. 5.
Figure 6:
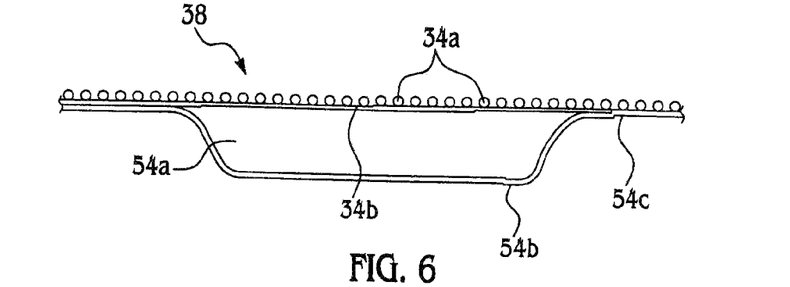
FIG. 6 is a sectional view taken along the line 6-6 in FIG. 5.

Referring now also to FIGS. 4-6 and 15, a compaction tool 54 is used to mold the composite frame 20. Tool 54 has essentially the same cross sectional shape as the frame 20, including a joggle 54a for molding the joggle 32 in the frame 20. Multiple full and/or partial plies 38 of fiber reinforced resin material, which may be a tape or fabric, are laid up over the tool 54. For illustrative purposes, only a single ply 38 of fabric is shown in FIGS. 4, 5 and 6. The plies 38 may comprise prepreg, or dry material that is later infused with the resin.

Figure 15:
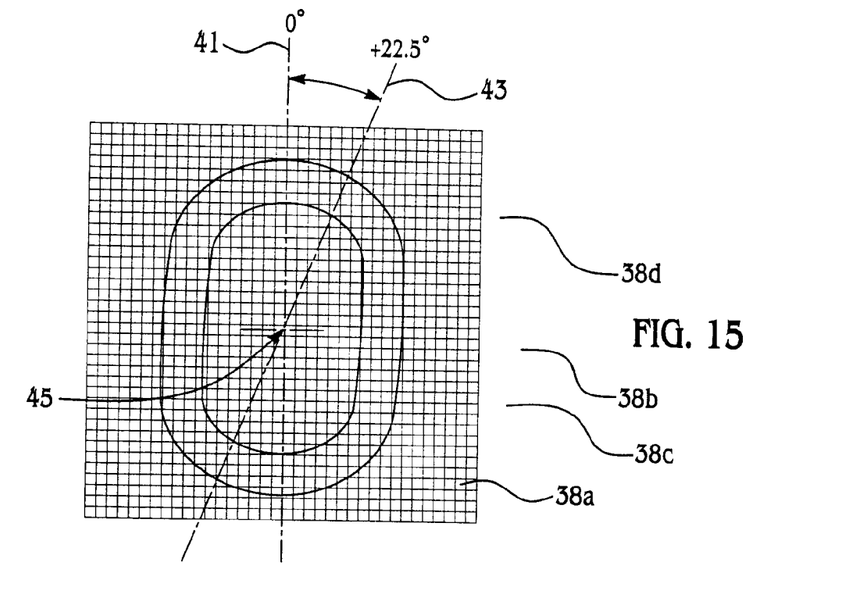
FIG. 15 illustrates a ply layup pattern forming a fixed axis rosette.

FIG. 15 illustrates a partial ply buildup of multiple plies 38a-38d having fiber orientations that radiate substantially from a fixed point or central axis 45. As the plies 38 are laid up in succession over the tool 54, each of the plies 38 is indexed a preselected amount about a fixed, central axis 45 so that the completed layup forms a pattern that may be referred to as a fixed "rosette". In the embodiment illustrated in FIG. 15, one of the plies 38d has a fiber orientation 43 of +22.5 degrees relative to a 0 degree reference axis 41.

During the layup process, each ply 38 is normally laid in the smaller tool surface area 54b and the S-shaped joggle 54a, and then is formed onto the larger tool surface area 54c. Depending on the orientation of the plies 38, some of the reinforcing fibers 34a may extend inwardly with their free ends cantilevered over the joggle 54a prior to compaction, while other ones of the fibers 34b may bridge over the joggle 54a, supported on each of their ends by the tool surface area 54c.

The reinforcing fibers 34a, 34b may have a relatively high modulus and are therefore relatively stiff. As used herein, "stiff" fibers refers to reinforcing fibers that possess a modulus sufficiently high such that they resist stretching during ply compaction over tooling having stepped or uneven surfaces. As a result, fibers such as fibers 34b that bridge over portions of the tool joggle 54a resist compaction due to the fact that they are relatively stiff and are supported at their opposite ends on tool surface 54c. An area 55 of fiber bridging is better illustrated in FIG. 5A, wherein a fiber 34b is suspended over or "bridges" the joggle 54a, due to the curvature of the tool surface 54c. The slit 42 (FIG. 5) formed in the ply 38 cuts the fiber 34b, allowing the ply to be compacted into the joggle 54a. The slit 42 may, but need not lie, along an axis 57 that is perpendicular to the axis of the fiber 34b.

It should be noted here that the joggle 54a defined by the stepped tool surfaces 54b, 54c is merely illustrative of one form of numerous uneven surface conditions that may prevent plies 38 from being fully compacted due to fiber bridging. Accordingly, "stepped surfaces" as used herein is intended to include a wide variety of surface conditions presenting changes in surface contours that may result in fiber bridging.

Figure 7:
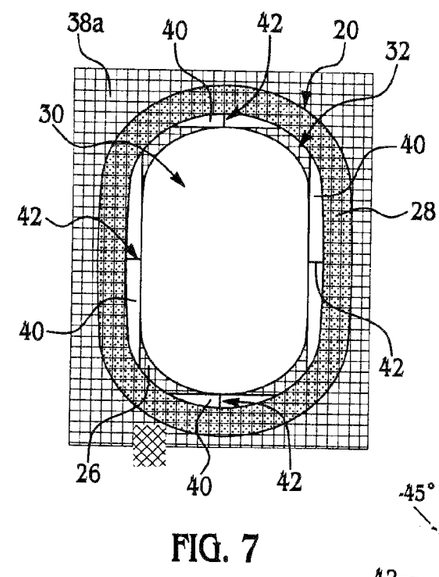
FIG. 7 illustrates the window frame of FIG. 1 in elevation showing a typical ply having 0, +90 degrees fiber orientation, and indicating the areas of possible fiber bridging.
Figure 8:
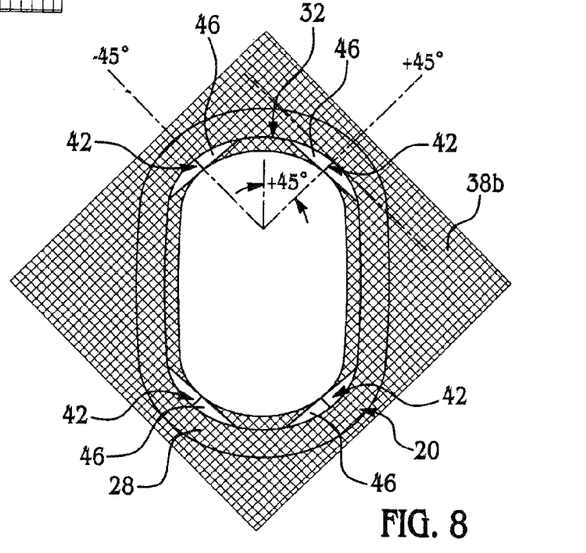
FIG. 8 is an illustration similar to FIG. 7 but showing a ply with +45, −45 degree fibers, and corresponding areas of possible fiber bridging.
Figure 9:
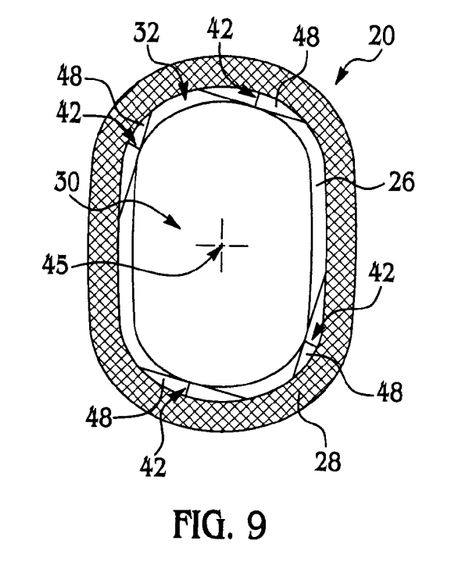
FIG. 9 is an illustration similar to FIG. 7 but showing areas of possible fiber bridging where the fibers are oriented at +22.5 degrees and −67.5 degrees, respectively.
Figure 10:
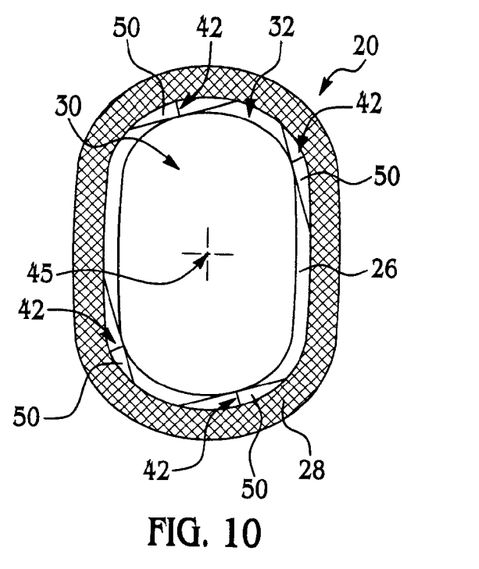
FIG. 10 is an illustration similar to FIG. 7 but showing areas of possible fiber bridging where the fibers are oriented at +67.5 degrees and −22.5 degrees, respectively.

FIGS. 7, 8, 9 and 10 illustrate the areas where the fiber bridging may occur for various ply orientations. In FIG. 7, for example, bridging of the fibers 34 may occur in the areas designated at 40 for plies having fiber orientations of 0 and 90 degrees. Fiber bridging in the joggle 32 may occur in the areas designated at 46 in FIG. 8 for plies having fiber orientations of +45, −45. As shown in FIG. 9, bridging may occur at areas 48 along the joggle 32 for plies that have fiber orientations of +22.5 and −67.5 degrees. Finally, as shown in FIG. 10, fiber bridging may occur at areas 50 for plies containing fibers having orientations of +67.5 and −22.5 degrees.

In accordance with the illustrated embodiments, bridging of the fibers 34b as described above may be reduced or eliminated by forming openings in the plies 38, which may be slits indicated at 42, in the areas 40, 46, 48, 50 where bridging may otherwise occur. In the case of the illustrated window frame 20, the slits 42 are made in each of the plies 38, beginning at an edge of the ply 38 and extending in a direction perpendicular, or approximately perpendicular to the orientation of the bridging fibers 34b. The slits 42 may have a length approximately equal to the combined width of the inner flange 26 and the joggle 32. As previously mentioned, the plies 38, such as plies 38a-38d shown in FIG. 15, are angularly oriented relative to each other about a fixed central axis 45 as they are being laid up over the tool 54.

Figure 11:
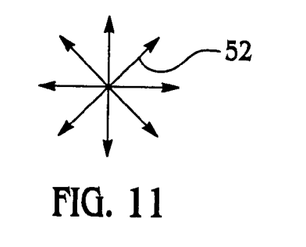
FIGS. 11-13 illustrate the staggering of slit locations for various ply orientations.
Figure 12:
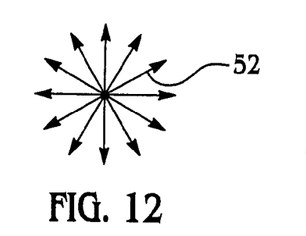
Figure 13:
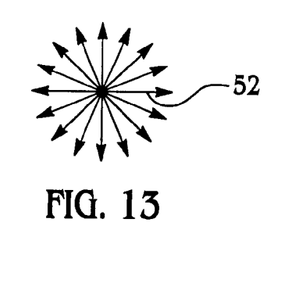
Figure 14:
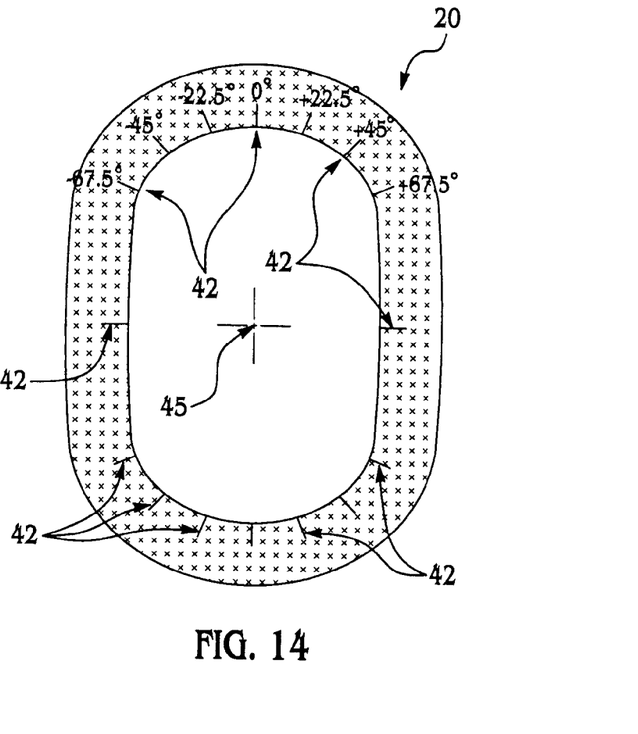
FIG. 14 illustrates the slit locations for ply orientations of 0, +/−22.5, +/−45, +/−67.5 and 90 degrees.

By using additional ply orientations other than the conventional 0, 90, +/−45 degrees, greater staggering of the locations of slits 42 is achieved, resulting in a composite frame 20 that exhibits improved homogeneous properties. FIG. 11 diagrammatically illustrates the direction 52 of fibers for conventional ply orientations of 0, 90, +/−45 degrees. In this example, 8 plies of tape, or 4 plies of fabric are required to provide an evenly distributed, balanced ply buildup. FIG. 12 illustrates the direction 52 of fibers used for a ply buildup in which the plies have orientations 0, 90, +/−30, +/−60 degrees. 12 plies of tape or 6 plies of fabric are required to achieve balance in the ply buildup shown in FIG. 10. Finally, as shown in FIG. 13, the fiber directions 52 are shown for a ply buildup having orientations of 0, 90, +/−22.5, +/−45, +/−67.5 degrees. It should be noted here that although particular ply orientation combination have been disclosed in the illustrated embodiments, including those with 22.5 and 30 degree orientation increments, a wide variety of ply schedules may be employed, including various other ply orientations, and increments of angular orientation The ply buildup shown in FIG. 13 requires 16 plies of tape or 8 plies of fabric to achieve a balanced ply buildup. FIG. 14 illustrates the location of the slits 42 formed in the fabric or tape for the ply buildup of FIG. 13. As previously indicated, the slits 42 are formed in the fabric or tape in those areas where fiber bridging may occur.

From the above, it can be appreciated that by using a greater number of ply orientations and evenly balancing the locations of the slits 42 to eliminate fiber bridging, a laminated composite structure 20 exhibiting relatively homogeneous properties may be fabricated using relatively simple, repeatable layup techniques, such as laying up the plies in a fixed axis rosette pattern.

Figure 16:
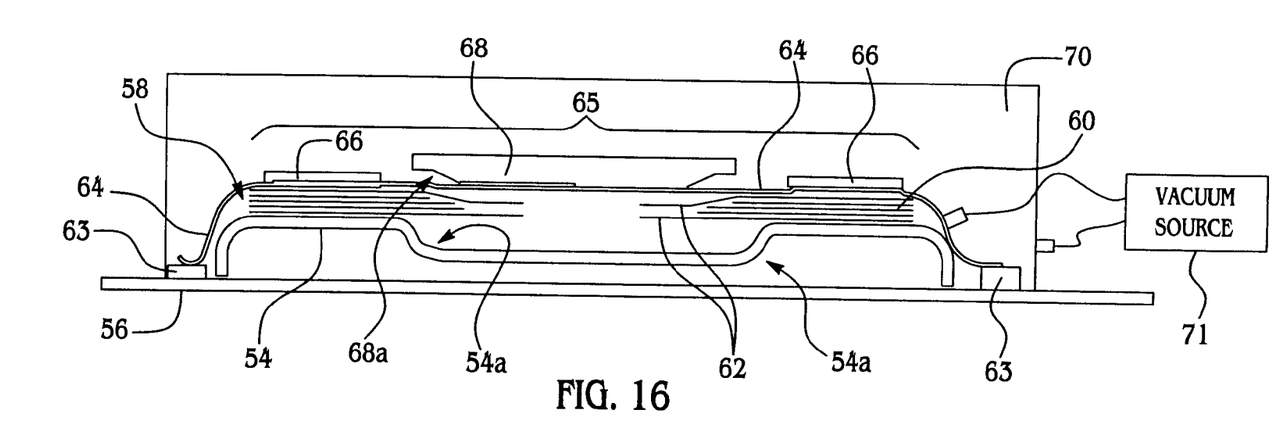
FIG. 16 is a sectional illustration of a vacuum box showing a prepreg layup and tooling before layup consolidation.

The method of fabricating the composite window 20 described above may be carried out using either a dry layup that is later infused with resin, or by using prepreg plies. Various techniques for compacting the plies may be employed. For example, one form of vacuum bagging method for ply compaction is shown in FIG. 16. Partial and full plies 60, 62 respectively, are arranged as a layup 58 over a tool 54, using the method previously described. The tool 54 includes surfaces that form the features on one side of the composite window 20. For example, the surfaces of the tool 54 may include an S-shaped section 54a which aids in forming the joggle 32 (FIG. 3) in the finished part 20. A vacuum bag 64 is placed over the combination of the tool 54 and the layup 58. A seal 63 seals the bag 64 to a base 56. Displaceable tooling 65 comprising a pinch plate 66 and a plug 68 are positioned over the bag 64. In some cases, small amounts of air may be present between the plies 60, 62 in central areas of the layup 58. When bag 64 is evacuated, the outer edges of the bag 64 compress the outer edges of the layup 58, thereby compacting the outer areas of the layup 58 before the central areas are compacted, potentially causing the air to be trapped in the central areas. In order to reduce the possibility of this air entrapment, an optional vacuum box 70 may be placed over the bag 64 and displaceable tooling 65, and sealed (not shown) to the base 56. Evacuation of air within the box 70 while the bag 64 is being evacuated equalizes the pressure applied to the layup 58 by the bag 64, and prevents the outer edges of the bag 64 from compressing the outer areas of the layup 58 before the air is evacuated from the central areas of the layup 58.

The pinch plate 66 and plug 68 may be displaced downwardly by any of various mechanical devices such, without limitation, as a pneumatic piston or a gear driven drive (not shown). Alternatively, compaction pressure may be applied to the layup 58 by other means such as an inflatable donut (not shown).

Figure 17:
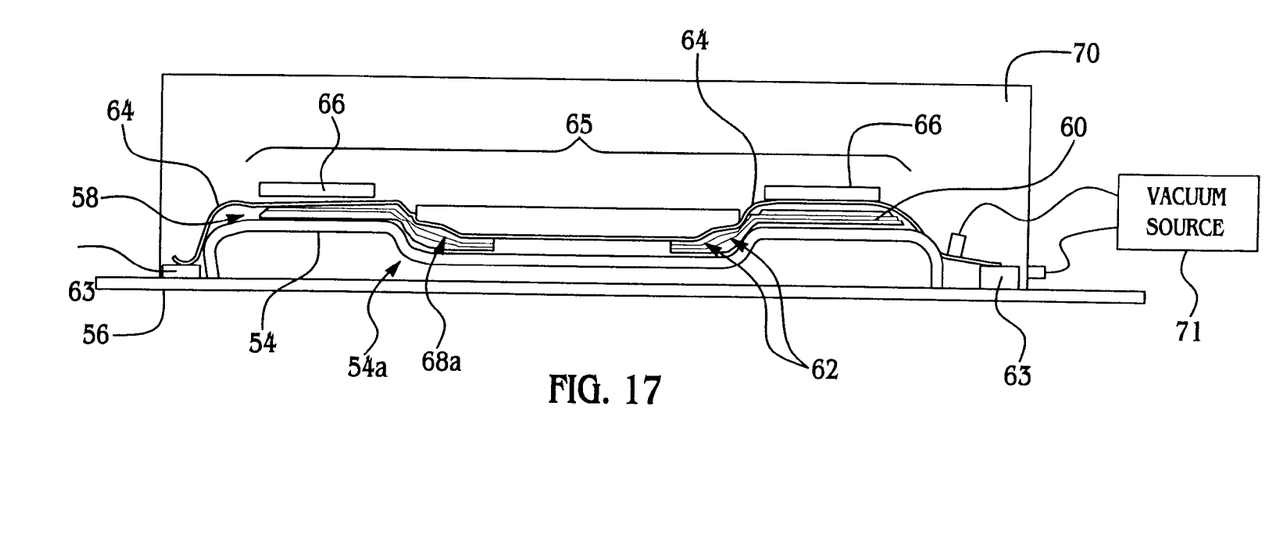
FIG. 17 is an illustration similar to FIG. 14 but showing the tooling having been activated to consolidate the layup.

FIG. 17 shows the pinch plate 66 and plug 68 having been displaced downwardly to compact the plies 60, 62 against the tool 54. The plug 68 includes a curved surface 68a which aids in forming the joggle 32 (FIG. 3) in the frame 20.

Figure 18:
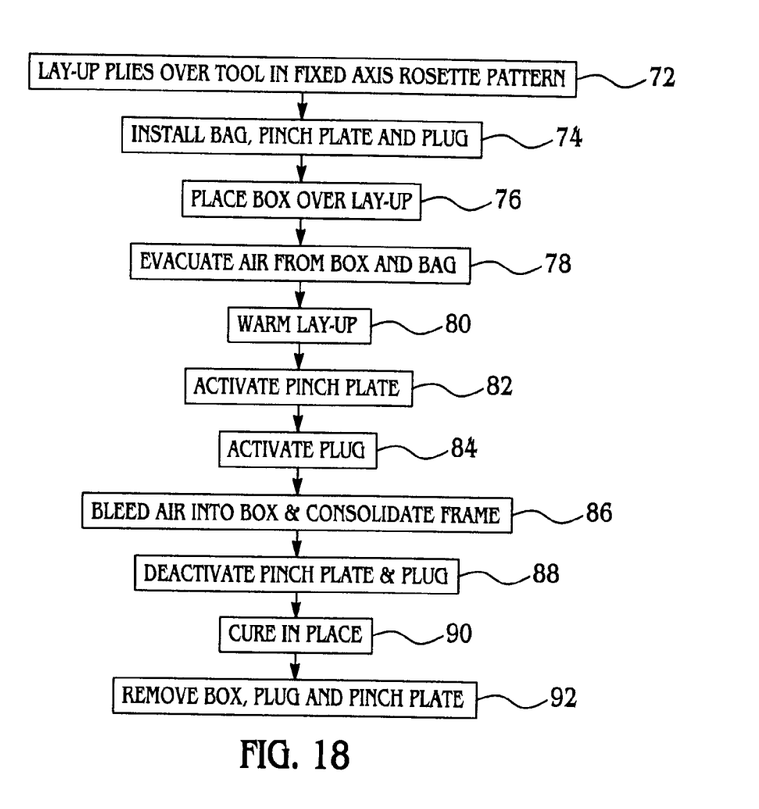
FIG. 18 is a flow chart illustration the steps of a method for fabricating fiber reinforced structures having stepped surfaces.

Reference is now made to FIG. 18 which shows the overall steps of the method for fabricating the composite window frame 20 from a prepreg material. Beginning with step 72, the partial and full plies 60, 62 respectively are laid up over the tool 54. As previously noted, the orientation of the plies is rotated as they are cut such that the completed layup forms a plurality of orientations about a fixed axis rosette. Next, the bag 64 is placed over layup 58, and the pinch plate 66 and plug 68 are installed, as shown at step 74. At step 76, a box 70 is placed over the combination of the tool 54 and layup 58. Next, at step 78, air is evacuated from both the bag 64 and box 70 using a vacuum source 71.

At step 80, the layup 58 is heated to the free flowing temperature of the resin in the prepreg plies 60, 62. At step 82, the pinch plate 66 is activated so as to be displaced downwardly against the bag 64 and tooling 54, thereby aiding in the compaction of the plies 60, 62. At step 84, the plug 68 is then activated so as to be downwardly displaced against the plies 60, 62 in the joggle area 54a of the tooling 54. Next, at step 86, air is allowed to bleed back into the box 70 while the vacuum remains within the bag 64. By evacuating air from the box 70 before the plies 60, 62 are fully compressed, the ambient air pressure pressing against central areas of the layup 58 is reduced. By reducing this pressure on the central areas of the layup 58 as the compaction process is commenced, the amount of air that may be trapped between the plies in the central region of the layup 58 may be reduced, or eliminated.

At step 88, the pinch plate 66 and plug 68 are deactivated, thereby relieving the pressure mechanically applied to the layup 58. Next, at step 90, the compacted layup 58 is allowed to cure. Finally, the box 70, plug 68 and pinch plate 66 are removed, as shown at step 92.

Figure 19:
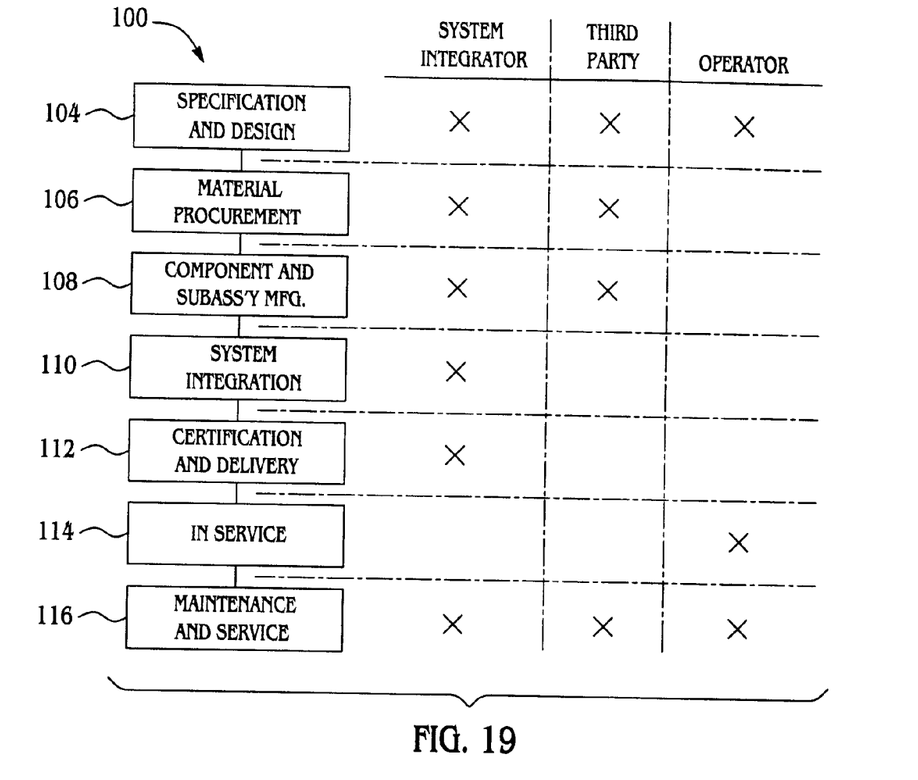
FIG. 19 is a flow diagram of aircraft production and service method.
Figure 20:
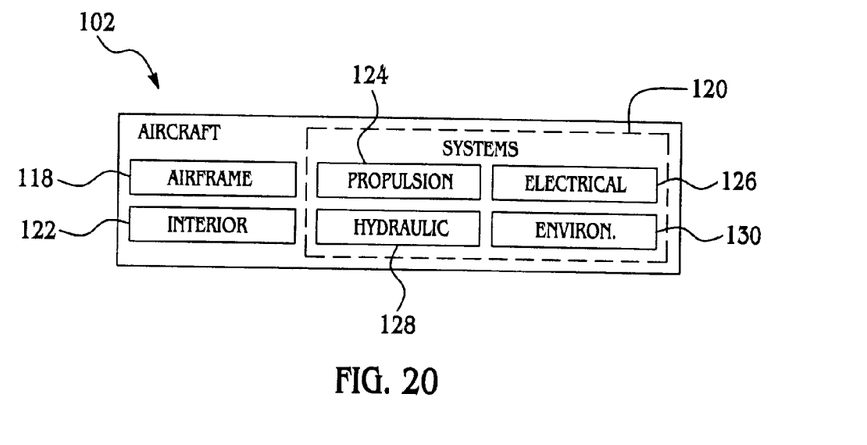
FIG. 20 is a block diagram of an aircraft.

The embodiments of the disclosure described above may be used in an aircraft manufacturing and service method 100 as shown in FIG. 19 and an aircraft 102 as shown in FIG. 20. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may include modification, reconfiguration, refurbishment, and so on).

Each of the processes of method 100 may be performed or carried out by a system integrator, a third party, and/or an operator (e.g., a customer), as indicated by the "X" in the grid to the right of the flow diagram of FIG. 19. For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 20, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a fiber reinforced composite structure having a curved stepped surface, comprising the steps of:
    laying up a plurality of fiber reinforced material plies in a fixed axis rosette pattern over a tool having a curved stepped tool surface for forming a curved joggle, a curvature of the stepped tool surface comprising a compound curvature including an S-shaped curvature in a direction substantially parallel to a direction of a step comprising the curved stepped tool surface;
    forming an opening in each of the plurality of fiber reinforced material plies in an area of the curved stepped surface where fibers in the plurality of fiber reinforced material plies cross and bridge the curved joggle such that the opening is oriented in a direction perpendicular to axes of orientation of fibers for the plurality of fiber reinforced material plies; and,
    consolidating the plurality of fiber reinforced material plies.

2. The method of claim 1, wherein forming the opening includes forming a slit in each of the plurality of fiber reinforced material plies beginning at an edge of the curved stepped tool surface.

3. The method of claim 1, wherein forming the opening includes forming slits in the plurality of fiber reinforced material plies in the area of the curved stepped tool surface.

4. The method of claim 1, wherein laying up includes orienting the plurality of fiber reinforced material plies relative to each other about the fixed axis as the plurality of fiber reinforced material plies are being laid up.

5. The method of claim 1, wherein laying up includes orienting at least certain of the plurality of fiber reinforced material plies such that fiber orientations in at least certain plies are disposed at angles other than 0, +45, −45 and 90 degrees.

6. A method of fabricating a composite structure reinforced with fibers and having a curved stepped feature, comprising the steps of:
    arranging at least certain of a plurality of composite plies having the fibers over a tool having a stepped tool surface such that at least certain fibers bridge over the curved stepped feature, a curvature of the stepped tool surface comprising a compound curvature including an S-shaped curvature in a direction substantially parallel to a direction of a step comprising the tool, wherein arranging results in a curved joggle in the plurality of composite plies;
    cutting the certain fibers in an area of the curved stepped feature where fibers in the plurality of composite plies cross and bridge the curved joggle to form openings such that the openings are oriented in a direction perpendicular to axes of orientation of fibers for the plurality of composite plies; and,
    compacting the plurality of composite plies.

7. The method of claim 6, wherein cutting includes forming at least one slit in the plurality of composite plies.

8. The method of claim 6, wherein arranging includes orienting the plurality of composite plies relative to each other about a fixed axis as the plurality of composite plies are being arranged over the tool.

9. The method of claim 8, wherein the plurality of composite plies are oriented such that a fiber direction in at least certain of the plurality of composite plies are disposed at angles other than 0, +45, −45 and 90 degrees.

10. The method of claim 6, wherein arranging includes orienting the plurality of composite plies relative to each other about a fixed axis such that the openings are angularly spaced from each other about the fixed axis.

* * * * *